Patented Dec. 21, 1926.

1,611,531

UNITED STATES PATENT OFFICE.

MAURICE KAHN, OF PARIS, AND ELIANE LE BRETON AND GEORGES SCHAEFFER, OF STRASSBURG, FRANCE, ASSIGNORS TO SOCIÉTÉ FRANCAISE DES PRODUITS ALIMENTAIRES AZOTES, OF PARIS, FRANCE.

PROCESS FOR AUTOHETEROLYSIS OF ANIMAL AND VEGETABLE SUBSTANCES.

No Drawing. Application filed June 16, 1925, Serial No. 37,574, and in France June 17, 1924.

One method of autolyzing vegetable or animal albuminoid substances consists in obtaining conditions for medium by which the ferments act in the presence of an antiseptic which prevents the development of the bacteria of putrefaction. This antiseptic must be volatile to allow of its removal after autolysis whereby the products obtained can be used as food.

Autolysis of brewer's yeast produces without the admixture of any antiseptic a mixture of cellular residues and nitrogenous autolysate. This autolysate as described in an application Serial No. 750,951 possesses antiseptic and diastastic properties as regards the transformed or degraded albumins.

We have found that the mixture of the cellular residues with the autolysate resulting from autolysis of the yeast possesses antiseptic properties identical with those of the autolysate, and these properties are made use of in the autolysis of animal and vegetable substances in accordance with this invention without previous separation of the antiseptic.

According to this invention the autolysis of animal or vegetable matters is effected in the presence of autolyzed brewer's yeast.

The method of operation is preferably the following:—

Yeast is preferably autolyzed for from three to five days under optimal conditions, the autolyzed yeast being then added to animal or vegetable albuminoid substances which it is desired to degrade to the state of peptones or aminated acids.

If these substances do not contain a sufficient quantity of proteolytic diastases and if the yeast contains insufficient thereof to supply the deficiency, an addition of these substances is made.

Autolysis is allowed to continue until the desired products are obtained.

After filtration and evaporation a paste of peptones, peptides or aminated acids is obtained.

No trace of putrefaction is observed provided the quantity of autolyzed yeast coming into action is sufficient.

Example.

After yeast has been autolyzed from three to five days at a temperature of 40° C. (for example), an addition is made of an equal or greater weight of crushed fish. If the fish does not contain a sufficient quantity of viscera and therefore of ferments, these are added.

When autolysis is complete, the resultant product is sieved, dried and filtered. There is obtained:—

1. The whole of the skeletons or cartilaginous residues, shells, etc., remaining on the sieve. These residues, after crushing and degreasing by the aid of any suitable process, give a powder which is rich in salts of lime and contains a certain percentage of phosphates and nitrogen; they may be used either as manure or as starting materials for the manufacture of phosphates, glues or gelatins.

2. The greases derived from the autolysis of the fish are collected during the drying and filtration.

3. All the cellular residues of yeast and the nonliquefied albuminoids of fish are also collected; these residues contain greases which have been emulsified by the cellular residues of the yeasts and form products which can be used in tawing.

4. Filtration yields a liquid which constitutes the nitrogenous autolysate and contains the major portion of the nitrogen of the fish and of the yeast; this liquid will yield on evaporation pastes or powders of peptones and aminated acids.

The pastes obtained after the combined autolysis of yeasts and vegetable or animal albuminoid substances possess more or less pronounced bitter qualities. The removal of these bitter qualities may be effected by any suitable known process.

The two following methods may, however, be employed with advantage:—

(A) The liquors of autolysis are evaporated in vacuo until they are of a syrupy consistency. They are then subjected in thin layers to the action of hot air (about 50° C.) until complete desiccation. When the resins of hops or other bitter principles contained in autolysates are oxidized in this manner with air the powders obtained will only be mildly bitter.

The desiccating apparatus employed may either be stove plates or apparatus similar to those employed in the manufacture of milk powders or any other process in which liquids are desiccated in thin layers.

(B) Powders thus obtained may be completely freed from their bitter properties by treatment with alcohol. For this purpose they are extracted with boiling alcohol for about one hour in any suitable extraction apparatus such as the Kumagawa type, which comprises a retort containing an extracting medium, a vessel in the retort containing the substance to be extracted and equipped with a siphon, and a suitable condenser which condenses the products of evaporation from the retort and allows them to run back into the vessel from which they are again siphoned into the retort. Such apparatus is well known in the art and constitutes no part of the present invention. The powder loses during this treatment about seven to eight per cent of its weight. The extracting alcohol is easily recovered by any known means.

The pastes obtained may be directly or after removing their bitter properties considerably improved by the addition of sapid products and odorous extracts of a great number of alimentary products. For example, shell fish, crustacean and echinoderm edibles, mushrooms, truffles, vegetables, etc.

These extracts are obtained in the following manner:—

The product dried or not as may be necessary is fully extracted by alcohol or any other organic solvent of lipoids miscible in water in apparatus of the Kumagawa type or any other apparatus employed for this purpose.

The solvent is evaporated in vacuo; if necessary the residue is freed from greases, for example, by treating with carbon tetrachloride or other volatile solvent; the extractions are effected merely by agitation in the presence of water, followed by decantation. Sapid substances remain in aqueous solution and on concentration pastes are obtained which added to any of the autolysates confer to them a flavour suitable for cookery purposes.

This process improves the taste of pastes however derived and whether the result of simple or mixed autolysis.

What we claim is:—

1. A process of mixed autolysis which consists in effecting autolysis of albuminoid matters in the presence of a suitable quantity of autolyzed brewer's yeast.

2. A process of mixed autolysis which consists in preparing autolyzed yeast, immediately mixing this with albuminoid matter without the addition of an antiseptic and subjecting the mixture to autolysis.

3. A process of mixed autolysis which consists in effecting autolysis of fish material in the presence of a suitable quantity of autolyzed brewer's yeast.

4. A process of mixed autolysis which consists in preparing autolyzed yeast, immediately mixing this with fishy material without the addition of an antiseptic and subjecting the mixture to autolysis.

5. A process of mixed autolysis which consists in effecting autolysis of albuminoid matters in the presence of a suitable quantity of autolyzed brewer's yeast and filtering and separating the greasy matters contained in the residues therefrom.

6. A process of mixed autolysis which consists in effecting autolysis of albuminoid matters in the presence of a suitable quantity of autolyzed brewer's yeast and filtering and separating therefrom together with the autolyzed brewer's yeast residues the greasy matters emulsified with the said residues.

7. A process of mixed autolysis which consists in effecting autolysis of albuminoid matters in the presence of a suitable quantity of autolyzed brewer's yeast and filtering and evaporating the filtrate to obtain a paste.

8. A process of mixed autolysis which consists in effecting autolysis of albuminoid matters in the presence of a suitable quantity of autolyzed brewer's yeast, filtering, evaporating in vacuo to a syrupy consistency and subjecting the syrup to the action of hot air.

9. A process of mixed autolysis which consists in effecting autolysis of albuminoid matters in the presence of a suitable quantity of autolyzed brewer's yeast, filtering and evaporating the filtrate to obtain a paste, and extracting with boiling alcohol in a manner to extract the bitter properties therefrom.

10. A process of mixed autolysis which consists in effecting autolysis of albuminoid matters in the presence of a suitable quantity of autolyzed brewer's yeast, filtering and evaporating the filtrate to obtain a paste, and adding flavouring to the product obtained.

11. A process of mixed autolysis which consists in effecting autolysis of albuminoid matters in the presence of a suitable quantity of autolyzed brewer's yeast, filtering, evaporating in vacuo to a syrupy consistency, subjecting the syrup to the action of hot air, and adding flavouring to the product obtained.

In testimony that we claim the foregoing as our invention we have signed our names this 2d day of June, 1925.

MAURICE KAHN.
ELIANE LE BRETON.
GEORGES SCHAEFFER.